United States Patent [19]

Gehrt et al.

[11] Patent Number: 4,897,608
[45] Date of Patent: Jan. 30, 1990

[54] CIRCUIT ARRANGEMENT FOR FREQUENCY-MODULATED PICTURE SIGNALS

[75] Inventors: Heinz H. Gehrt, Hamburg; Karl-Heinz Rehfeldt, Quickborn, both of Fed. Rep. of Germany

[73] Assignee: U.S. Philips Corporation, New York, N.Y.

[21] Appl. No.: 36,219

[22] Filed: Apr. 9, 1987

[30] Foreign Application Priority Data

Apr. 11, 1986 [DE] Fed. Rep. of Germany ....... 3612266

[51] Int. Cl.$^4$ .............................................. H03D 3/02
[52] U.S. Cl. .................................... 329/321; 329/336
[58] Field of Search .............. 329/137, 134, 145, 126, 329/131, 132, 133, 107, 110, 128, 321, 336; 307/359; 358/160

[56] References Cited

U.S. PATENT DOCUMENTS

| 3,701,030 | 10/1972 | Gocho et al. | 329/134 |
| 4,142,208 | 2/1979 | Oprandi et al. | 371/72 |
| 4,585,952 | 4/1986 | Yamamoto | 307/359 |

FOREIGN PATENT DOCUMENTS 0072659 6/1979 Japan .................................. 329/131

OTHER PUBLICATIONS

Shadden, V. A., "Reference Feedback Circuit for Phase-Modulated Signal Demodulation", IBM Technical Disclosure, vol. 17, #11, pp. 3319–3320.

"So funktioniert ein Videorecorder", by U. Grothaus, Funkschau, 1984, vol. 15, pp. 42–45.

Primary Examiner—James J. Groody
Assistant Examiner—David E. Harvey
Attorney, Agent, or Firm—Edward W. Goodman

[57] ABSTRACT

A circuit arrangement for a picture reproducing apparatus having an amplitude limited (7), to which a frequency-modulated picture signal is applied and whose output is coupled to a frequency demodulator (8, 9). The output signal of the amplitude limiter (7) is applied to a low-pass filter (12) via a delay means (8) which may form part of the frequency demodulator (8, 9), the output signal of the low-pass filter following fluctuations in time-average of the output signal of the delay means (8). The delay time of the delay means (8) is of the order of magnitude of a quarter of the carrier period of the frequency-modulated picture signal. The output signal of the low-pass filter (12) constitutes the threshold value of the amplitude limiter (7), the polarity of the output signal of said limiter being changed when the frequency-modulated picture signal intersects said threshold value.

7 Claims, 1 Drawing Sheet

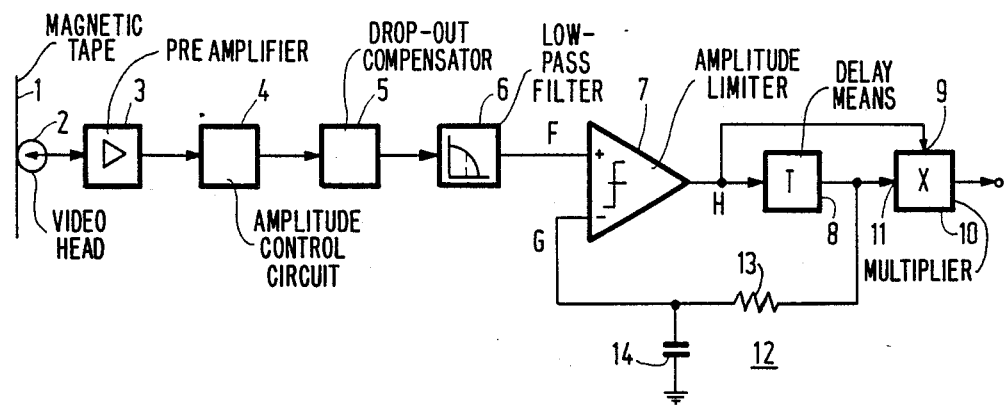
FIG.1
FIG.2a
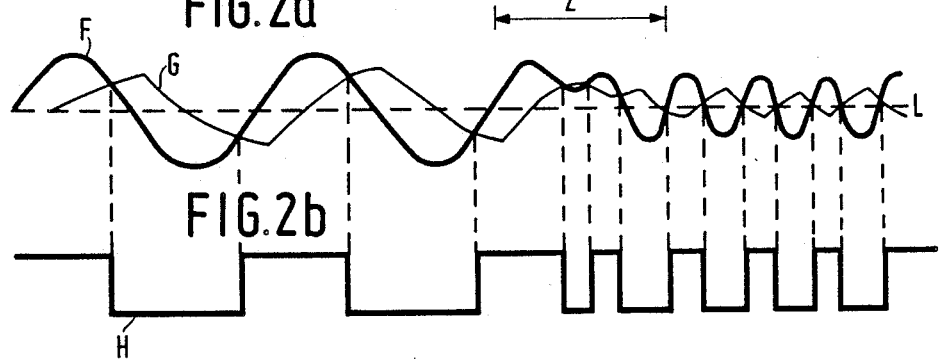
FIG.2b
FIG.2c

CIRCUIT ARRANGEMENT FOR FREQUENCY-MODULATED PICTURE SIGNALS

BACKGROUND OF THE INVENTION

The invention relates to a circuit arrangement for a picture reproducing apparatus comprising an amplitude limiter having an input and an output, which amplitude limiter is constructed to change the polarity of its output signal when a frequency-modulated picture signal on its input passes a threshold value, and a frequency demodulator, which is coupled to the output of the amplitude limiter.

A picture reproducing apparatus is to be understood to mean an apparatus which reproduces signals recorded on, for example, a magnetic tape or an optical storage disk and converts them into signals which can be processed by, for example, a television receiver. Such a picture reproducing apparatus may be a video recorder or a video-disk player. A circuit arrangement as defined in the foregoing for a video recorder is known from the magazine "Funkschau", 1984, Volume 15, pages 42 to 45, in particular FIG. 5. This circuit arrangement processes a frequency-modulated luminance signal (picture signal) which is applied from the magnetic tape to an amplitude limiter via video heads, a head amplifier and two series-connected filters. The amplitude limiter amplifies and limits the signal in such a way that when a constant threshold value is exceeded the polarity of the output signal of the amplitude limiter changes. The output signals of the amplitude limiter are applied to a frequency demodulator, which supplies a demodulated picture signal.

In the case of such a frequency-modulated luminance signal the upper limit value of frequency swing of the carrier-modulated wave corresponds to a white picture content and the lower limit value to a black picture content. If the picture content of the recorded frequency-modulated luminance signal suddenly changes from a black to white, i.e. the frequency of the frequency-modulated luminance signal jumps from a lower to a high frequency, the amplitude during reproduction via the tape-to-video head transmission path and the filters will decrease substantially. In the case of an unfavorable phase relationship of the signal it may happen that one or more cycles of the frequency-modulated signal do not intersect the threshold value of the limiter. Therefore, after limiting the frequency demodulator does not receive a high-frequency signal component. Consequently, the demodulator generates a low-frequency signal, i.e. a television receiver will reproduce a black picture content. This means that signal inversion has occurred.

SUMMARY OF THE INVENTION

It is the object of the invention to construct a circuit arrangement of the type defined in the opening paragraph in such a way that no signal inversion occurs in the case of a frequency jump.

According to the invention this object is achieved in that the output of the amplitude limiter is coupled to the input of a low-pass filter via a delay means whose delay time T is of the order of magnitude of a quarter of the carrier period of the frequency-modulated picture signal, the output of said low-pass filter being coupled to a second input of the amplitude limiter to apply the threshold value to the amplitude limiter.

In the circuit arrangement in accordance with the invention a squarewave signal is produced on the output of the amplitude limiter which amplifies and the limits the frequency-modulated picture signal. The output signal of the amplitude limiter is delayed in the delay means and applied to a low-pass filter which rapidly follows time fluctuations of the time-average of the output signal of the delay means. This results in the threshold value of the amplitude limiter being shifted. The output signal of the low-pass filter forms the new threshold value for the amplitude limiter. Thus, it is also possible to allow for fluctuations in the case of a frequency jump. The delay of the output signal of the amplitude limiter is necessary to ensure that the gain of the amplitude limiter is not reduced as a result of negative feedback.

In this respect it is to be noted that from DE-AS 26 31 335 and DE-PS 32 18 264 circuit arrangements are known which also solve the problem of signal inversion. However, both arrangements are of a very intricate construction. Further, it is to be noted that from U.S. Pat. No. 4,142,208, FIG. 4, a demodulation circuit for video signals is known, which circuit comprises a low-pass filter. However, this circuit arrangement does not include the delay means. As a result of this, the known arrangement is not capable of solving the present problem.

It has been found that in a practical circuit arrangement the delay time T of the delay means must be selected to comply with:

$$0.225/f_o < T < 0.275/f_u,$$

where $f_u$ is the lower limit frequency and $f_o$ is the upper limit frequency of the frequency swing of the carrier-modulated wave.

Another embodiment is characterized in that the amplitude limiter comprises a differential amplifier whose non-inverting input constitutes the first-mentioned input and whose inverting input constitutes the second input of the amplitude limiter. The differential amplifier limits the difference between the frequency-modulated picture signal and the output signal of the low-pass filter.

The frequency demodulator may be constructed in such a way that it comprises said delay means and an additional amplifier. To this end, the outputs of the amplitude limiter and the delay means are each coupled to an input of a multiplier which is constructed to supply a demodulated picture signal.

BRIEF DESCRIPTION OF THE DRAWINGS

Embodiments of the invention will now be described in more detail, by way of example, with reference to the accompanying drawings. In the drawing:

FIG. 1 shows a part of a video recorder circuit comprising a circuit arrangement in accordance with the invention, and FIG. 2 is a waveform diagram to illustrate the operation of the arrangement shown in FIG. 1.

DETAILED DESCRIPTION OF THE INVENTION

In FIG. 1 a frequency-modulated luminance signal recorded on a magnetic tape 1 is reproduced by means of a video head 2. The carrier frequency of the frequency-modulated luminance signal is approximately 4.3 MHz and its swing ranges between approximately 3.8 and 4.8 MHz. In a preamplifier 3 the frequency-modulated luminance signal is amplified and is subsequently applied to an amplitude control circuit 4, which compensates for small fluctuations of the signal amplitude resulting from deviations in sensitivity of the magnetic tape and the magnetic head and from tracking errors of the magnetic head. The output signal of the amplitude control circuit 4 is applied to a drop-out compensator 5 which detects drop-outs in a frequency-modulated luminance signal and inserts a signal stored in the preceding line to compensate for said drop-outs. The output of the drop-out compensator 5 is connected to a low-pass filter 6 having a cut-off frequency of approximately 5 MHz. The low-pass filter 6 limits the signal bandwidth of the frequency-modulated luminance signal to a required minimum value and thus contributes to noise reduction.

It is assumed that prior to frequency modulation and recording the luminance signal V is as shown in FIG. 2a In the signal portion shown in FIG. 2a the picture content of the luminance signal V suddenly changes from a black level S to a white level W, i.e., the frequency of the frequency-modulated signal exhibits a frequency jump from a low to a high frequency. In particular, as a result of the tape-to-video head transmission path and the filtering, the amplitude of the frequency-modulated signal suddenly decreases substantially in the event of such a frequency jump. In the case of an unfavorable phase relationship one or more cycles of the frequency-modulated luminance signal may vary irregularly, as is shown in FIG. 2b during a time interval Z of the frequency-modulated luminance signal F. The time interval Z begins at an instant at which the modulated luminance signal changes from black to white.

If the frequency-modulated luminance signal F is now amplified and subsequently limited in an amplitude limiter signal inversion occurs, as ill be demonstrated hereinafter. As is shown in FIG. 2b the threshold value L of the amplitude limiter has a constant average value. A high frequency of the frequency-modulated luminance signal F corresponds to white level, while a low frequency corresponds to black level. As is apparent from FIG. 2b, several cycles do not intersect the threshold value L during the interval Z. As a result of this, the frequency of the frequency-modulated luminance signal F is reduced in the time interval Z. In the picture reproduced by a television receiver after demodulation this results in the picture content being reproduced as black instead of white, i.e. an inversion effect occurs.

Such a signal inversion is precluded by a circuit arrangement in accordance with the invention as will be described hereinafter. The output signal of the low-pass filter 6 is applied to a non-inverting input of an amplitude limiter 7. The amplitude limiter 7 comprises a differential amplifier which receives a difference signal formed by the difference between the output signal of the low-pass filter 6 and the output signal of a low-pass filter 12. The non-linear characteristics of the differential amplifier result in limiting. The output of the amplitude limiter 7 is connected to a delay means 8 and to a first input 9 of a multiplier 10. The output signal of the delay means 8 is applied to a second input 11 of the multiplier 10 and also to the low-pass filter 12 comprising a resistor 12 and a capacitor 14. The delay means and the multiplier 10 constitute a frequency demodulator. One terminal of the resistor 13 is connected to the output of the delay means 8 and the other terminal is connected to the inverting input of the amplitude limiter 7 and to the capacitor 14 which is connected to a reference potential.

The delay time T of the delay means 8 must be equal to a quarter of the carrier period of the frequency-modulated luminance signal. It has been found that in a practical circuit arrangement the delay time T must be selected to comply with:

$$0.225/f_o < T < 0.275/f_u,$$

where $f_u$ is the lower limit frequency of 3.8 MHz and $f_o$ is the upper limit frequency of 4.8 MHz of the frequency swing of the carrier-modulated wave. The cut-off frequency of the low-pass filter 12 is approximately 3 MHz. The cut-off frequency of the low-pass filter 12 must be selected to allow for the fact that the output signal of the low-pass filter 12 can follow fluctuations in the time-average of the output signal of the delay means 8.

The low-pass filter 12 supplies an output signal G, which is shown in FIG. 2b. If the signals F and G cross one another the polarity of output signal of the amplitude limiter 7 will change. The signal G is therefore the threshold value of the amplitude limiter 7. When the signals F and G cross one another the threshold value of the amplitude limiter is corrected in conformity with the actual signal value.

The output signal H of the amplitude limiter 7 is shown in FIG. 2c. The duration of such a squarewave in the signal H is characteristic of the frequency of the frequency-modulated signal. The frequency of the frequency-modulated signal decreases as the duration of such a squarewave increases. Since the duration of the squarewave signals in the time interval Z is substantially smaller than that of the other square-waves the frequency jump from a lower to a higher frequency is also demodulated. Thus, no inversion effects can occur.

We claim:

1. A circuit for a picture reproducing apparatus comprising an amplitude limiter having a first input for receiving a frequency-modulated picture signal and an output for outputting an output signal, which amplitude limiter is constructed to change the polarity of its output signal when the frequency-modulated picture signal on its input exceeds a threshold value, and a frequency demodulator which is coupled to the output of the amplitude limiter, characterized in that the output of the amplitude limiter is coupled to the input of a low-pass filter via a delay means whose delay time T is substantially equal to a quarter of a carrier period of the frequency-modulated picture signal and, the output of said low-pass filter being coupled to a second input of the amplitude limiter to apply the threshold value to the amplitude limiter.

2. A circuit as claimed in claim 1, wherein the amplitude limiter comprises a differential amplifier whose non-inverting input constitutes said first input of the amplitude limiter and whose inverting input constitutes the second input of the amplitude limiter.

3. A circuit as claimed in claim 1, wherein the outputs of the amplitude limiter and of the delay means are each coupled to an input of a multiplier, which multiplier is constructed to supply a demodulated picture signal.

4. A circuit as claimed in claim 2, wherein the outputs of the amplitude limiter and of the delay means are each coupled to an input of a multiplier, which multiplier is constructed to supply a demodulating picture signal.

5. A circuit for picture reproducing apparatus comprising an amplitude limiter having a first input for receiving a frequency-modulated picture signal and an output for outputting an output signal, which amplitude limiter is constructed to change the polarity of its output signal when the frequency-modulated picture signal on its input exceeds a threshold value, and a frequency demodulator which is coupled to the output of the amplitude limiter, characterized in that the output of the amplitude limiter is coupled to the input of a low-pass filter via a delay means whose delay time T has the following range of values:

$$0.225/f_o < T < 0.275/f_u,$$

where $f_u$ is the lower limit frequency and $f_o$ is the upper limit frequency of the frequency swing of a carrier-modulated wave of the frequency-modulated picture signal, the output of said low-pass filter being coupled to a second input of the amplitude limiter to apply the threshold value to the amplitude limiter.

6. A circuit as claimed in claim 5, wherein the amplitude limiter comprises a differential amplifier whose non-inverting input constitutes said first input of the amplitude limiter and whose inverting input constitutes the second input of the amplitude limiter.

7. A circuit as claimed in claim 5, wherein the outputs of the amplitude limiter and of the delay means are each coupled to an input of a multiplier, which multiplier is constructed to supply a demodulating picture signal.

* * * * *